July 14, 1925.  
E. B. STIMPSON  
LACING HOOK FEEDING DEVICE  
Original Filed Dec. 9, 1922
1,546,150
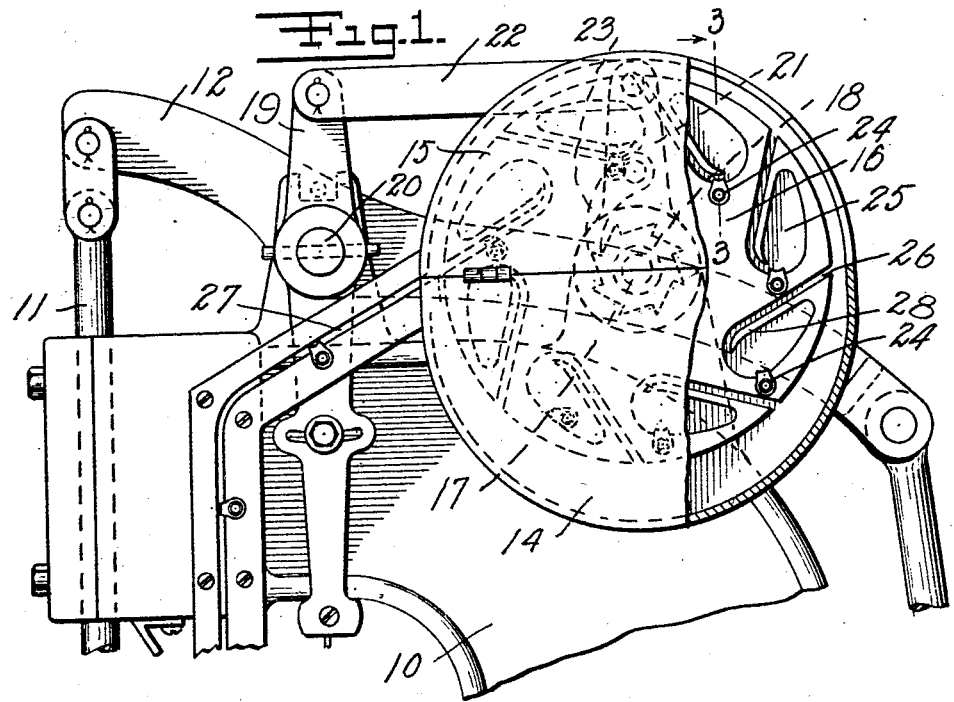
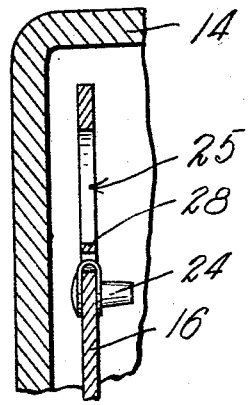

Patented July 14, 1925.

1,546,150

UNITED STATES PATENT OFFICE.

EDWIN B. STIMPSON, OF BROOKLYN, NEW YORK, ASSIGNOR TO EDWIN B. STIMPSON COMPANY, OF BROOKLYN, NEW YORK.

LACING-HOOK-FEEDING DEVICE.

Original application filed December 9, 1922, Serial No. 605,832. Divided and this application filed December 21, 1923. Serial No. 681,968.

*To all whom it may concern:*

Be it known that I, EDWIN B. STIMPSON, a citizen of the United States, residing at Brooklyn, in the county of Kings and State of New York, have invented certain new and useful Improvements in Lacing-Hook-Feeding Devices, of which the following is a specification.

This invention relates generally to devices for individually picking up lacing hooks from bulk and delivering them one at a time in a certain prearranged disposition to a feed way leading to any suitable lacing hook setting device. The present application is a division of my prior application Serial No. 605,832, Dec. 9, 1922.

The general object of the invention is to provide a device of the general nature described for insuring the feeding of one hook at a time and for arranging the hooks in proper disposition for consecutive delivery to the work as rapidly as is required.

The invention includes a new and improved pick-up wheel having means for insuring that a sufficiently large number of hooks will be gathered and positively retained on the wheel for certain delivery to the feedway to provide a surplus storage column of hook members to await the operation of the setting device.

The construction of the pick-up wheel or disk includes a series of equidistant openings each having an elongated passage opening thereinto at the inner end and opening at the other end to the periphery of the disk. The passageway thus provided has a straight-line formation and extends at an angle to the radius of the disk with the outer end leading the rearward end with respect to the direction of rotation of the disk. The opening from which each passageway leads has an ovoid formation with the larger end inward so that certain of the hook members which fall into the openings in the movement of the disk through the mass of hooks engage the lower edge of the opening between the spaced apart members and slide therealong as the disk rotates. The disk is preferably so arranged with relation to the sides of the hook receptacle that the hook members which so engage the slideway edge are forced to take the proper position with respect to their subsequent placement in the work.

The passageways leading from the openings are so inclined as to permit the hook members to slide by gravity into a feedway when the disk arrives at a certain angular position in its rotation.

Other features of the invention will be hereinafter referred to.

In the drawings in which a preferred embodiment of the invention has been selected for illustration, Figure 1 is a view in side elevation of a lacing hook feeding pick-up device embodying the invention.

Figure 2 is a view in cross section of the device shown in Figure 1.

Figure 3 is a view in cross section on an enlarged scale taken on the line 3—3 of Figure 1.

Referring to the drawings for a more detailed description of the invention, at 10 there is shown the head or standard of a lacing hook setting machine of any desired type which is provided with a reciprocating plunger 11 operated by the rock arm 12.

Mounted on the head member 10 by means of supporting bracket 13 is a receptacle or container 14 having a hinged cover member 15 through which lacing hooks can be placed in the receptacle. A pick-up wheel or disk 16 is carried by a shaft 17 journaled in a side wall of the hook receptacle 14 and a ratchet wheel 18 is carried by the shaft 17 outside of the hook receptacle. An arm 19 is fixed to a shaft 20 which is adapted to be rocked by the rock arm 12 in the operation thereof. A similar arm 21 is carried by the shaft 17 and a link connection 22 extending between the arms 19 and 21 provides for the operation of the arm 21 by the arm 19. A pawl member 23 carried by the arm 21 cooperates with the ratchet wheel 18 to rotate the pick-up wheel 16 with a step by step movement as will be clear.

The pick-up disk 16 is mounted relatively close to the side wall of the receptacle 14 in which the disk shaft is journaled, the distance separating the disk and receptacle wall being such that the stem ends of the hook members 24 which are handled by the device cannot extend in a perpendicular direction across this space. The pick-up disk 16 is provided with a series of openings 25 which are generally ovoid in shape and have a passageway 26 leading from the large and inner ends thereof to the outer periphery of the disk. Each passageway has a straight-line direction and leads outwardly from the opening 25 at an angle to the radius of the disk, the angularity being such that the outer end of the passageway leads the inner end in the rotation of the disk.

With the construction thus provided hook members such as are shown at 24 fall into the openings 25 in the rotation of the disk 16 in the mass of hook members contained in the receptacle 14. As the disk is moved through the mass of hook members those hook members which are so disposed that the opening between the members of the hook portion are in alinement with the lower edge of the openings are disposed in a partially enclosing or straddling relation to the edge of the opening as is clearly indicated in Figure 3 of the drawing. As the disk continues its rotation in a counter-clockwise direction in Figure 1 of the drawing the hook members 24 are progressively carried toward the inner and larger end of the opening 25 and into the elongated passageway 26 so that as the passageway reaches a point in the upper left hand portion of the disk as viewed in Figure 1 the passageway comes into alinement with an angularly disposed feedway 27 whereupon the hook member is impelled by gravity to move out of the passageway 26 into the feedway 27 where it descends to a position near the work in which it is to be set.

It will be seen that in the progressive movement of the hook member 24 from the point at which it comes into straddling engagement with the lower edge of the opening 25 when the opening is in a position within the mass of hook members, constantly maintains a suspended relation to the edge from which it is supported so that there is little or no likelihood of the hook being jarred from its position; with the result that once the hook members becomes engaged with the supporting edge in the opening they are invariably delivered to the feedway 27 in the rotation of the disk. This retention of the hook members in place is still further insured when the containing opening is passing through the upper arc of its path of travel by reason of the provision of the elongated passageway 26 referred to. This passageway is formed by a tongue or finger 28 which forms a narrow separating member between the passageway and the main body of the opening 25. It will be seen that the narrowness of the passageway prevents the turning of the hook on its supporting edge or its removal from the edge so that the delivery of the hook member from the outer edge of the opening into the feedway 27 is assured.

In the step by step rotation of the pick-up disk 16 which is provided by the pawl and ratchet mechanism referred to the disposition of the passageways 26 is such that a period of dwell obtains at a point where each passageway in turn comes into alinement with the feedway 27 into which the hook members 24 are to be delivered. This insures the delivery of such hook members as may be in place in the passageway into the feedway before the rotation of the pick-up disk 16 is resumed.

It will thus be seen that I have provided a pick-up or gathering machine for lacing hooks which picks up properly disposed hooks from a mass of hooks through which the disk rotates and once having picked up such properly disposed hooks invariably delivers them without loss to the final point of delivery to the feedway. By reason of the certainty of delivery of the engaged hooks to the feedway the assurance of a sufficient accumulation of properly arranged hooks for operation by the setting device is obtained so that no interruption of the setting or placing mechanism is likely to occur by reason of the failure of a supply of properly arranged hook members.

What I claim is:

1. In a lacing hook feeding device, a hopper for containing a collection of lacing hooks, and a pick-up wheel in the hopper, the wheel having a plurality of transverse openings each including a relatively narrow passage having an outlet at the periphery of the wheel, the width of the passage being such as to permit passage of lacing hooks therethrough only in an edgewise direction.

2. In a lacing hook feeding device, a hopper for containing a collection of lacing hooks, and a pick-up wheel in the hopper, the wheel having a plurality of transverse openings, each transected by a finger inwardly directed from a point near the periphery of the wheel, and said wheel being provided with passageways leading into said transverse openings from the periphery thereof, said fingers defining one of the lateral edges of said passageways.

3. In a lacing hook feeding device, a hopper for containing a collection of lacing hooks, and a pick-up wheel in the hopper, the wheel having a plurality of transverse openings, each transected by a finger inwardly directed from a point near the periphery of the wheel, the fingers being shaped and disposed to establish on one side thereof passages having a width approximately equal to the thickness of the hook material at the bowl of the lacing hook.

4. In a lacing hook feeding device, a hopper for containing a collection of lacing hooks, and a pick-up wheel in the hopper, the wheel having a plurality of transverse openings, each transected by a finger inwardly directed from a point near the periphery of the wheel, the finger being shaped and disposed to establish on one side thereof a passage having a width approximately equal to the thickness of the hook material at the bowl of the lacing hook, and the remainder of the opening being of a considerably greater width.

5. In a lacing hook feeding device, a hopper for containing a collection of lacing hooks, and a pick-up wheel in the hopper, the wheel having a plurality of transverse openings, each transected by a finger inwardly directed from a point near the periphery of the wheel, the finger being shaped and disposed to establish on one side thereof a passage having a width approximately equal to the thickness of the hook material at the bowl of the lacing hook, the wall of the passage carried by a part of the wheel other than the finger blending smoothly with the continuing wall of the opening.

6. In a lacing hook feeding device, a hopper for containing a collection of lacing hooks, and a pick-up wheel in the hopper, the wheel having a plurality of transverse openings, each transected by a finger inwardly directed from a point near the periphery of the wheel, the finger being shaped and disposed to establish on one side thereof a passage having a width approximately equal to the thickness of the hook material at the bowl of the lacing hook, the wall of the passage carried by a part of the wheel other than the finger blending smoothly with the continuing wall of the opening, the last-mentioned wall being curved.

7. In a lacing hook feeding device, a container for lacing hooks, and a pick-up disk mounted for rotation in the container, the pick-up disk having a hook-receiving opening therein and an elongated passageway leading from the inner end of the opening to the periphery of the disk, the relation of the elongated passageway to the opening being such that lacing hooks are fed through the passageway into the opening in the rotation of the disk.

8. In a lacing hook feeding device, a container for lacing hooks, and a pick-up disk mounted for rotation in the container, the pick-up disk having a hook-receiving opening therein and an elongated passageway leading from the inner end of the opening along the leading edge of the opening with respect to the direction of rotation of the disk, the passageway being restricted in width and inclined with relation to a radius of the disk whereby hooks entering the passageway from the opening will be retained in the passageway until they are delivered by gravity down the inclined path provided by the passageway in a certain position of the disk.

In testimony whereof I affix my signature.

EDWIN B. STIMPSON.